United States Patent
Aylett et al.

(10) Patent No.: US 11,693,873 B2
(45) Date of Patent: Jul. 4, 2023

(54) SYSTEMS AND METHODS FOR USING ENTITY/RELATIONSHIP MODEL DATA TO ENHANCE USER INTERFACE ENGINE

(71) Applicant: Global Software Innovation Pty Ltd, Baulkham Hills (AU)

(72) Inventors: Peter Kyra Aylett, North Ryde (AU); Diana Sandra Walker, Glenbrook (AU); Constantinos Christou, Collaroy Plateau (AU)

(73) Assignee: Global Software Innovation Pty Ltd, Baulkham Hills (AU)

( * ) Notice: Subject to any disclaimer, the term of this patent is extended or adjusted under 35 U.S.C. 154(b) by 149 days.

(21) Appl. No.: 16/074,529

(22) PCT Filed: Feb. 1, 2017

(86) PCT No.: PCT/AU2017/000033
§ 371 (c)(1),
(2) Date: Aug. 1, 2018

(87) PCT Pub. No.: WO2017/132718
PCT Pub. Date: Aug. 10, 2017

(65) Prior Publication Data
US 2019/0042581 A1    Feb. 7, 2019

(30) Foreign Application Priority Data
Feb. 3, 2016 (AU) .................. 2016900356

(51) Int. Cl.
*G06F 16/25* (2019.01)
*G06F 16/28* (2019.01)
(Continued)

(52) U.S. Cl.
CPC .......... *G06F 16/252* (2019.01); *G06F 16/211* (2019.01); *G06F 16/2423* (2019.01);
(Continued)

(58) Field of Classification Search
CPC .. G06F 16/252; G06F 16/2428; G06F 16/211; G06F 16/288; G06F 16/2423; G06T 11/206
(Continued)

(56) References Cited

U.S. PATENT DOCUMENTS 5,414,809 A * 5/1995 Hogan .................. G06F 3/0481
715/765
5,734,888 A    3/1998 Li et al.
(Continued)

OTHER PUBLICATIONS

"Tableau Desktop 8.0 Help," Tableau Software Inc., Mar. 20, 2013, <https://onlinehelp.tableau.com/v8.0/offline/en-us/tableau_desktop8.0.zip>, retreived on Mar. 3, 2017, 922 pages.
(Continued)

*Primary Examiner* — Seth A Silverman
(74) *Attorney, Agent, or Firm* — Slater Matsil, LLP

(57) ABSTRACT

A user interface for allowing a user to create a chart, the user interface comprising: an entity type selection area for allowing a user to select a type of entity; an explorer for displaying an entity-relationship schema associated with the selected entity type and allowing a user to navigate the schema via one or more relationship paths; a list area for displaying one or more available fields of an entity associated with a relationship path selected from the explorer; and a target area for displaying a list of bindable data targets and allowing a user to assign one or more of the available fields to the bindable data targets to create a chart.

19 Claims, 13 Drawing Sheets

(51) Int. Cl.
*G06F 16/242* (2019.01)
*G06F 16/21* (2019.01)
*G06T 11/20* (2006.01)

(52) U.S. Cl.
CPC ........ *G06F 16/2428* (2019.01); *G06F 16/288* (2019.01); *G06T 11/206* (2013.01)

(58) Field of Classification Search
USPC ........................................................ 715/700
See application file for complete search history.

(56) References Cited

U.S. PATENT DOCUMENTS

| | | | |
|---|---|---|---|
| 6,035,300 A | 3/2000 | Cason et al. | |
| 6,405,195 B1 | 6/2002 | Ahlberg | |
| 6,618,733 B1 * | 9/2003 | White | G06F 16/288 707/739 |
| 6,877,006 B1 | 4/2005 | Vasudevan | |
| 7,667,582 B1 * | 2/2010 | Waldorf | G06T 11/206 340/440 |
| 2005/0057566 A1 * | 3/2005 | Githens | G06F 19/321 345/440 |
| 2007/0005562 A1 * | 1/2007 | Chau | G06F 16/288 |
| 2012/0005045 A1 * | 1/2012 | Baker | G06Q 30/0643 705/27.2 |
| 2012/0191704 A1 | 7/2012 | Jones | |
| 2017/0228454 A1 * | 8/2017 | Bose | G06Q 20/4016 |
| 2018/0260365 A1 * | 9/2018 | Lagerblad | G06F 3/04847 |

OTHER PUBLICATIONS

"Entity-relationship model—Wikipedia," Feb. 1, 2016, <https://en.wikipedia.org/w/index.php?title=Entity-relationship_model&oldid=702774030>, retrieved on Mar. 2, 2021, 12 pages.

* cited by examiner

| | Personal Email |
|---|---|
| | Primary Email |
| | Currently Employed |
| | Employee Number |
| | Hire Date |
| | Start Date |
| | First Name |
| | Job Title |
| | Last Name |
| | Photo |

Fig. 7

SYSTEMS AND METHODS FOR USING ENTITY/RELATIONSHIP MODEL DATA TO ENHANCE USER INTERFACE ENGINE

CROSS-REFERENCE TO RELATED APPLICATIONS

This patent application is a national phase filing under section 371 of PCT/AU2017/000033, filed Feb. 1, 2017, which claims the priority of Australian patent application 2016900356, filed Feb. 3, 2016, each of which is incorporated herein by reference in its entirety.

TECHNICAL FIELD

Aspects of the present disclosure relate to entity-relationship models and more particularly to generating visualizations based on entity-relationship models.

BACKGROUND

In an entity-relationship (ER) model, data is modelled as 'entities'. For example, in an ER database employed at a law firm, data may be modeled under entities such as employees, projects, clients, contracts, risk, and so on. These entities are often related to other entities through 'relationships'. For example, the employee entities may be 'assigned to' projects, which in turn can be 'for' clients and may 'include' contracts.

In a typical ER database, the structure of the database is portrayed as a diagram that resembles the graphical breakdown of a sentence into its grammatical parts, where entities are equivalent to nouns and relationships are equivalent to verbs of a sentence. An entity can be defined by means of its properties or attributes whereas relationships can be defined based on the number of entities associated with the relationship, known as the 'degree' of a relationship.

Even though an ER database presents data in a simple manner, it is often difficult to discern business knowledge from the data, especially in very large databases. Accordingly, users often generate charts and other visualizations based on the underlying data to compress large amounts of ER data into an easily understandable format.

There are many existing systems that generate charts from underlying data. However, most of these systems first convert data from an underlying database into tabular form (either by creating an MS Excel spreadsheet or a comma separated variable (.csv) file) and then use the tabular data as input to generate the charts. It will be appreciated that this process of first converting structured data into tabular form and then using the tabular data to generate charts is cumbersome.

SUMMARY

Aspects of the present disclosure provide a system, method, and user interface that allows an ER model to be intuitively interrogated for generating charts, visualizations and other similar analysis. We present the term ReadiNow Engine Intelligence (REI) to refer to the introduced technology.

According to a first aspect of the present disclosure, a user interface is provided for allowing a user to create a chart. The user interface includes an entity type selection area for allowing a user to select a type of entity, and an explorer for displaying an entity-relationship schema associated with the selected entity type and allowing a user to navigate the schema via one or more relationship paths. The user interface further includes a list area for displaying one or more available fields of an entity associated with a relationship path selected from the explorer, and a target area for displaying a list of bindable data targets and allowing a user to assign one or more of the available fields to the bindable data targets.

According to a second aspect of the present disclosure, a method for displaying a chart based on entity relationship data is provided. The method includes the step of selecting an entity type; displaying one or more relationship paths of an entity relationship schema associated with the selected entity type; selecting a relationship path from the displayed entity relation schema; displaying one or more fields of an entity associated with the selected relationship path; assigning a displayed field to a bindable data target; and displaying a chart based on the field assigned to the bindable data target.

According to a third aspect of the present disclosure, a system for generating a visualization based on entity relationship data is provided. The system includes a user interface comprising: an explorer area for displaying one or more relationship paths of an entity relationship schema associated with a selected entity type; a list area for displaying one or more fields associated with a relationship path selected from the entity relationship schema; and a target area for displaying bindable data targets and allowing a user to assign one or more fields displayed in the list area to the bindable data targets. The system further comprises an input module configured to receive an entity type selection made by a user; and a chart generator configured to generate the chart based on the fields assigned to the bindable data targets.

According to a fourth aspect of the present disclosure, a computer readable medium is provided having stored thereon a computer program for generating visualizations based on entity relationship data. The computer program includes a user interface module configured to render a user interface including an explorer area for displaying one or more relationship paths of an entity relationship schema associated with a selected entity, a field area for displaying one or more fields associated with a relationship path selected from the entity relationship schema, and a target area for displaying bindable data targets and allowing a user to assign one or more fields displayed in the list area to the bindable data targets. The computer program also includes an extractor module configured to retrieve the entity relationship schema from a database for displaying on the user interface; an input module configured to retrieve user assignment of one or more fields to the bindable data targets; and a chart generator configured to generate a chart based on the retrieved user assignment of the one or more fields to the bindable data targets.

BRIEF DESCRIPTION OF THE DRAWINGS

At least one embodiment of the present invention will now be described with reference to the drawings and appendices, in which:

FIG. 7 is an exemplary list of fields of an 'employee' entity according to an aspect of the present disclosure.

DETAILED DESCRIPTION OF ILLUSTRATIVE EMBODIMENTS

Overview

We present the term ReadiNow Intelligent Engines (RIE) to refer to the introduced technology including, for example, one or more of the herein-described software applications and modules.

Systems and methods disclosed herein can be utilized to generate visualizations based on an underlying ER model. As described previously, an ER model or system is used to represent business objects as entities. Accordingly, an entity may represent a physical or abstract object such as a person, company, computer, car, or cost centre, for example. A distinction is made between the type of an entity and the instances of an entity. For example, a 'car' may be an entity type, whereas a Jeep Cherokee with a registration number AB1234UA is an instance of the 'car' entity. Furthermore, entities may be stored in the database with fields, such as a driver's name, a car's vehicle identification number (VIN), registration number, model, year, etc.

Entities in an ER model are bound to each other by relationships. For example, a person may own a car, a car may be manufactured by a company, or a cost centre may be within a department. In this example, 'owns', 'manufacture by' and 'within' are relationships between the entities person and car, car and company, and cost centre and department, respectively. Similar to entities, a distinction can be made between the type of a relationship and instances of that relationship. For example, cars in general can be related to their manufacturers, and their drivers. However, a particular car is related to a particular car model, or a particular driver. Note that a car has one model but may have zero, one or many drivers. The type of relationship specifies the cardinality of the relationship, namely whether multiple entities may be related—as well as whether those relationships are exclusive. Information about entity types, relationship types, and their cardinality is often collectively referred to as schema. Schema is the information about the structure of data.

Figure 4:
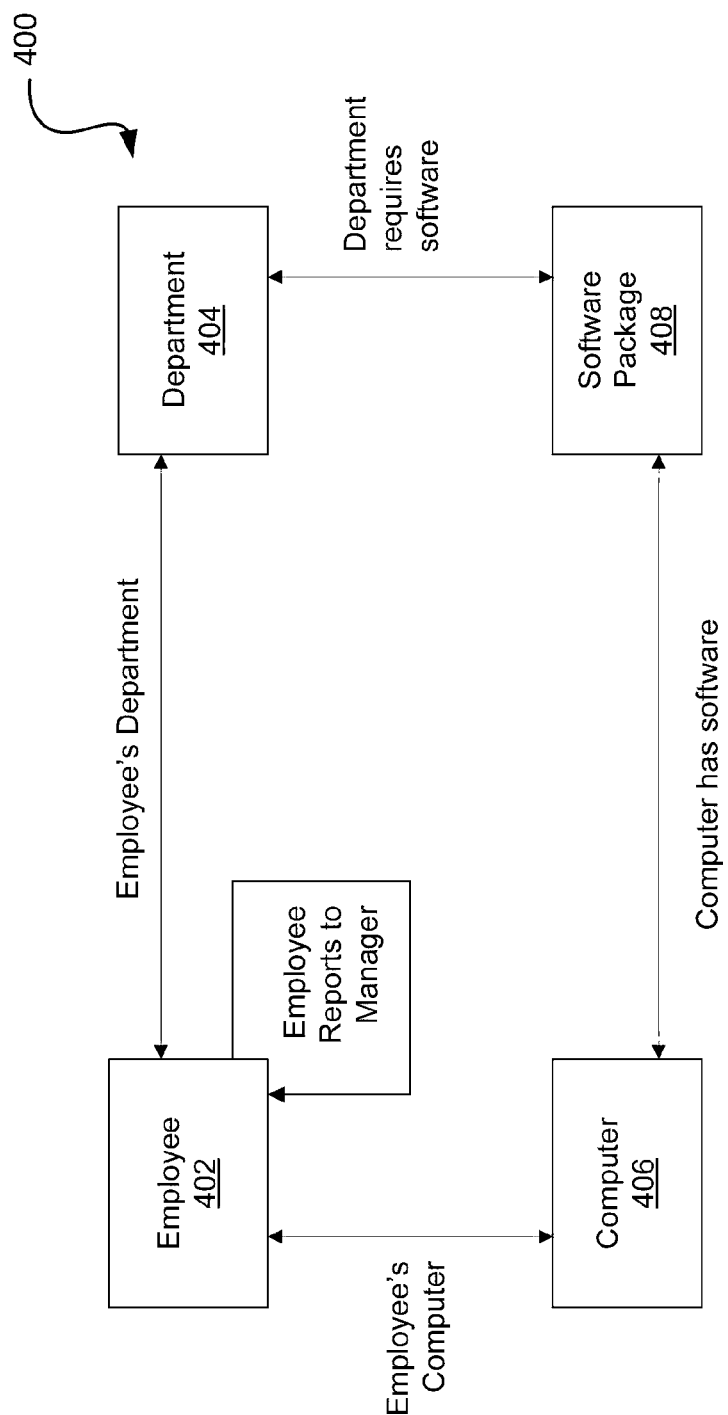
FIG. 4 is a diagram of an example entity-relationship schema.

FIG. 4 illustrates an exemplary ER schema 400 that will be utilized throughout this disclosure to describe aspects of the present invention.

The schema 400 includes four entity types interrelated through five relationship types. The entity types are represented as boxes whereas the relationship types are represented as arrows. The four entity types are employee 402, department 404, computer 406 and software package 408, and the five relationship types are employee's department 410, employees computer 412, department requires software 414, computer has software 416, and employee reports to manager 418.

Cloud Platform

According to one aspect, the visualizations associated with the ER model may be generated on a cloud platform, which provides a web-based service empowering users to solve their own business problems by creating their own web or desktop software applications without the need of computer programming or other technical knowledge. Further, web or desktop software applications created using the cloud platform may be customized.

The cloud platform also relieves the burden of important, but distracting, activities such as backup, security, scalability, and so on by providing these services within the platform itself.

Software applications can be built by users themselves, or they can be selected from a suite of pre-written applications, which are then customized by the user. It will be understood that the cloud platform is not limited to certain software applications and so the software applications provided by the RIE technology may be as varied as imagination permits. For example, the software applications may be directed towards customer relationship management, business continuity management, expense tracking, and so on.

The software applications include various software modules that logically make up a software experience, such as dashboards, data entry forms, reports, charts and other visualizations, as well as interactivity such as running workflows, triggering business processes, importing and exporting data, template document generation, email notifications, and so on.

At the heart of the cloud platform is a purpose built entity-relationship database. All data in the database is modelled as entities and the entities are associated with each other through relationships. A user may configure their own types of relationships between distinct entities to build an interconnected web of data. These relationships can then be traversed when generating visualizations.

Figure 1A:
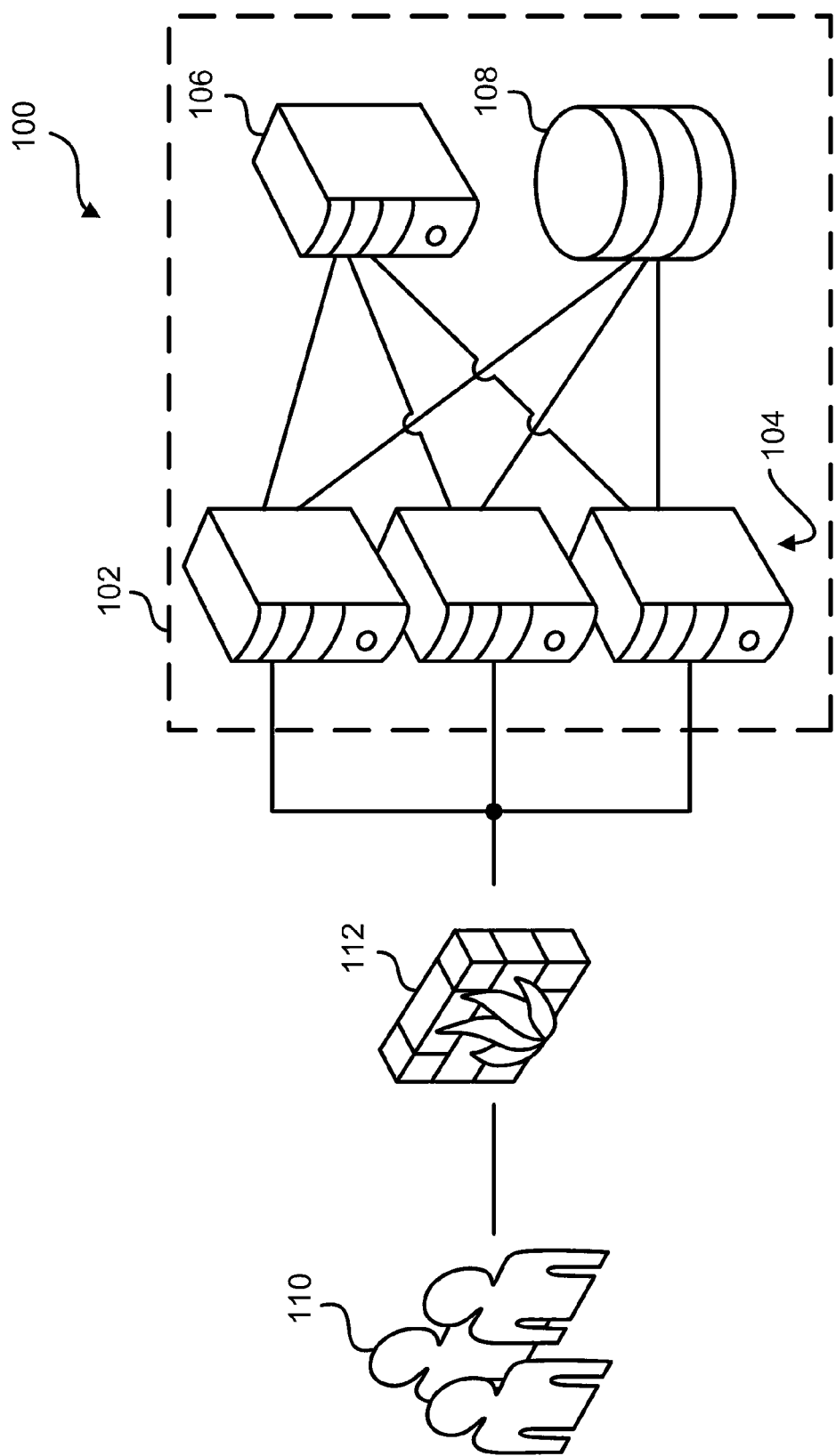
FIG. 1A is a schematic diagram of a cloud platform.

FIG. 1A is a schematic diagram illustrating the physical infrastructure 100 of an exemplary cloud platform 102. The cloud platform 102 is arranged in a fairly typical N-tier architecture including a plurality of front end web servers 104, a cache server 106, and a database server 108 for storing the ER data. The cloud platform 102 may receive web requests from customers no by an application delivery controller (ACD) 112 that routes requests to the front-end web server 104. The majority of the platform software resides on the front-end web servers 104, whereas the ER data resides in the database server 108. The cache server 106 may temporarily store an ER schema associated with a particular entity for fast access.

Figure 1B:
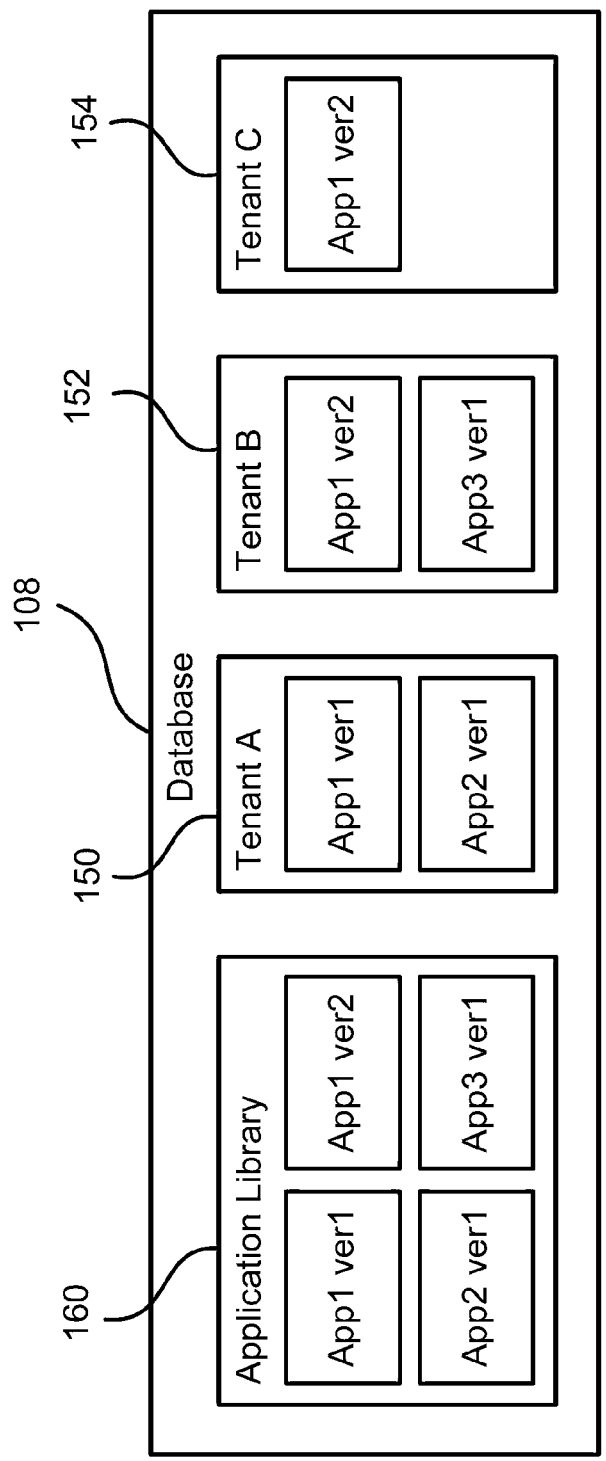
FIG. 1B is a block diagram of a multi-tenanted database.

The database server 108 may host multiple clients (tenants). Each storage area for each tenant can have different versions of different applications installed. Separate from the tenants, an application library hosts every available version of every available application. User data is also stored within the storage area associated with each tenant. FIG. 1B depicts a block diagram of an exemplary multi-tenanted database server 108, including storage areas 150, 152, and 154 for three tenants and an application library 160. A single set of database tables may hold all entity-relationship data for all tenants.

All user data is represented as entities and relationships, as described above. Additionally, all application components are described in the entity-relationship database. For example, a report may have columns and filters and formatting rules. These are all described as entities, and a report is connected to its columns, its filters, data source, and so on with relationships.

Moreover, the schema (or metadata) about the applications is also described using entities and relationships. The types of entities that are possible; the fields that they may possess; the relationship types that are defined; and the rules for validating input—these are all described using entities and relationships.

This unique cloud platform 102 structure means that all software modules developed to power the cloud platform 102 equally enrich the user's web-based applications, and vice versa.

As described previously, the above systems run on the cloud platform 102. Additionally, a body of code (a software client) is sent to and runs on the user's web browser. This code is configured to provide a user interface for generating visualizations based on the ER data.

The software client is structured as a single paged application (SPA), whereby all code is loaded upfront, and communication only goes back to the cloud platform 102 to fetch or modify data.

Computing Device

Figure 2A:
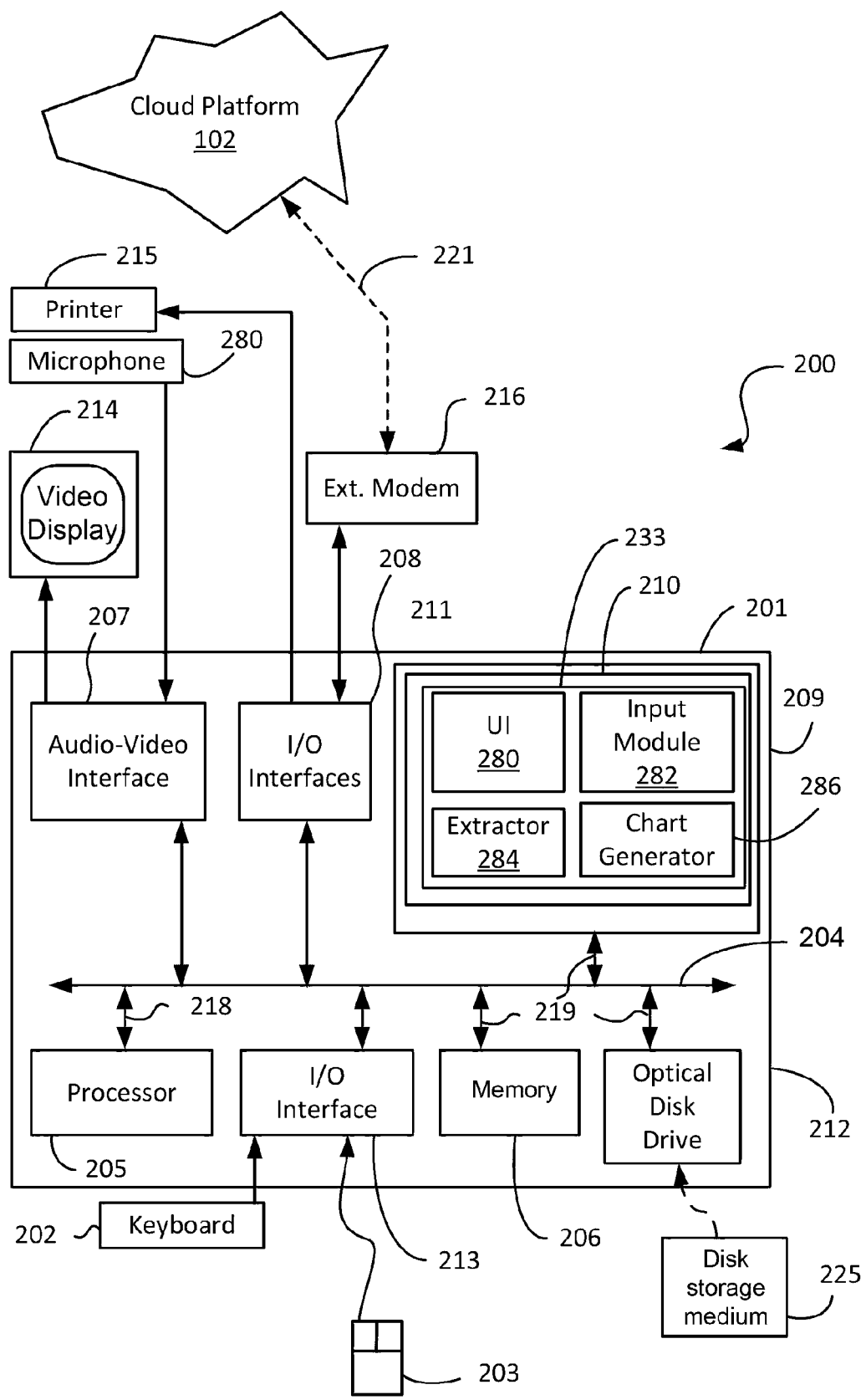
FIGS. 2A and 2B form a schematic block diagram of a general purpose computer system upon which arrangements described can be practiced.
Figure 2B:
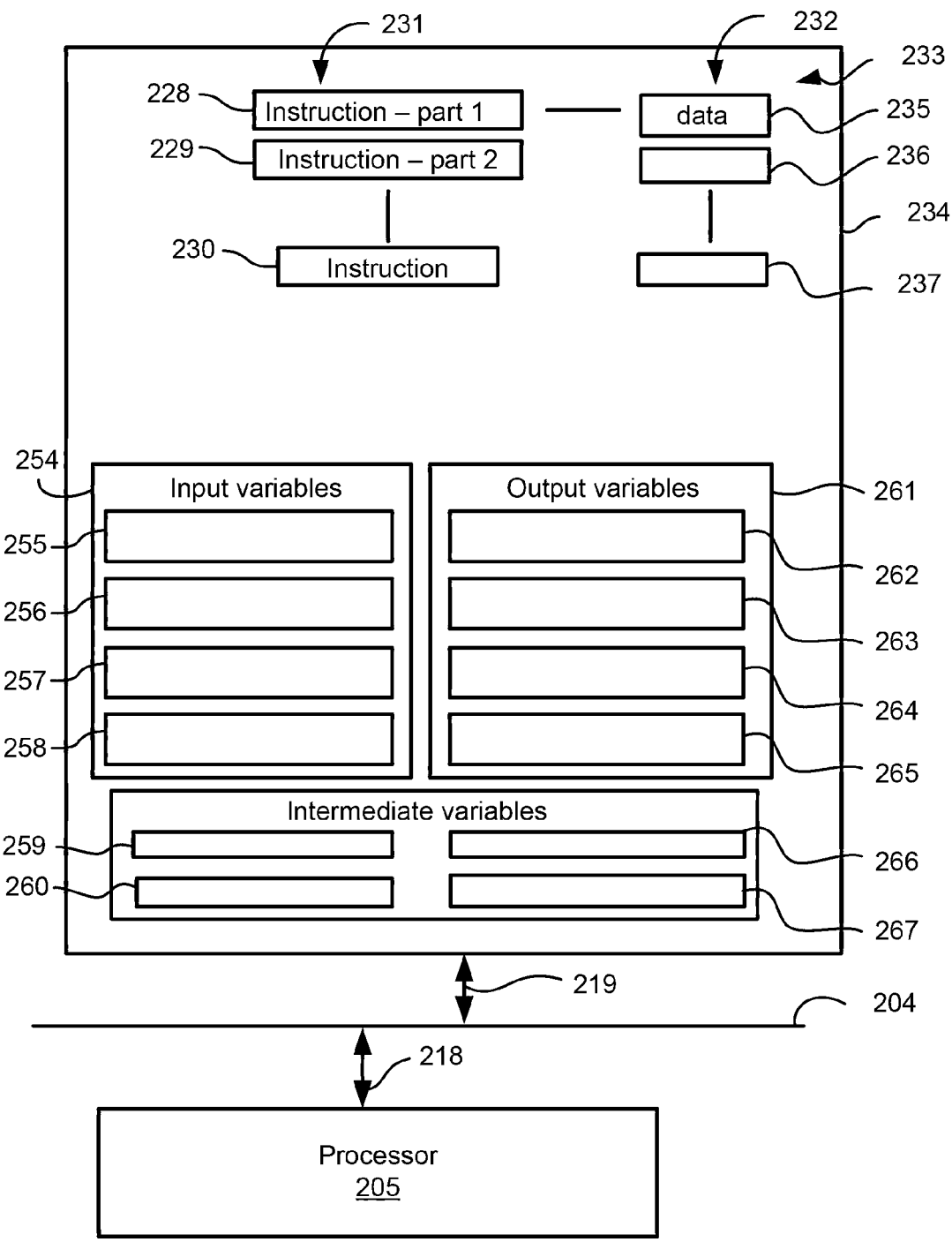

FIGS. 2A and 2B depict a general-purpose computer system 200, upon which the various arrangements described in the present disclosure can be practiced. For instance, users no may utilize computer system 200 to generate visualizations based on the ER data stored in the database 108.

As seen in FIG. 2A, the computer system 200 includes: a computer module 201; input devices such as a keyboard 202, a mouse pointer device 203, a microphone 280; and output devices including a printer 215, and a display device 214. An external Modulator-Demodulator (Modem) transceiver device 216 may be used by the computer module 201 for communicating to and from the cloud platform 102 via a connection 221.

The computer module 201 typically includes at least one processor unit 205, and a memory unit 206. For example, the memory unit 206 may have semiconductor random access memory (RAM) and semiconductor read only memory (ROM). The computer module 201 also includes a number of input/output (I/O) interfaces including: an audio-video interface 207 that couples to the video display 214 and microphone 280; an I/O interface 213 that couples to the keyboard 202, mouse 203 and optionally a joystick or other human interface device (not illustrated); and an interface 208 for the external modem 216 and printer 215. In some implementations, the modem 216 may be incorporated within the computer module 201, for example within the interface 208.

The I/O interfaces 208 and 213 may afford either or both of serial and parallel connectivity, the former typically being implemented according to the Universal Serial Bus (USB) standards and having corresponding USB connectors (not illustrated). Storage devices 209 are provided and typically include a hard disk drive (HDD) 210. Other storage devices such as a floppy disk drive and a magnetic tape drive (not illustrated) may also be used. An optical disk drive 212 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 200.

The components 205 to 213 of the computer module 201 typically communicate via an interconnected bus 204 and in a manner that results in a conventional mode of operation of the computer system 200 known to those in the relevant art. For example, the processor 205 is coupled to the system bus 204 using a connection 218. Likewise, the memory 206 and optical disk drive 212 are coupled to the system bus 204 by connections 219. Examples of computers on which the described arrangements can be practised include IBM-PC's and compatibles, Apple Mac™ or like computer systems.

Figure 11:
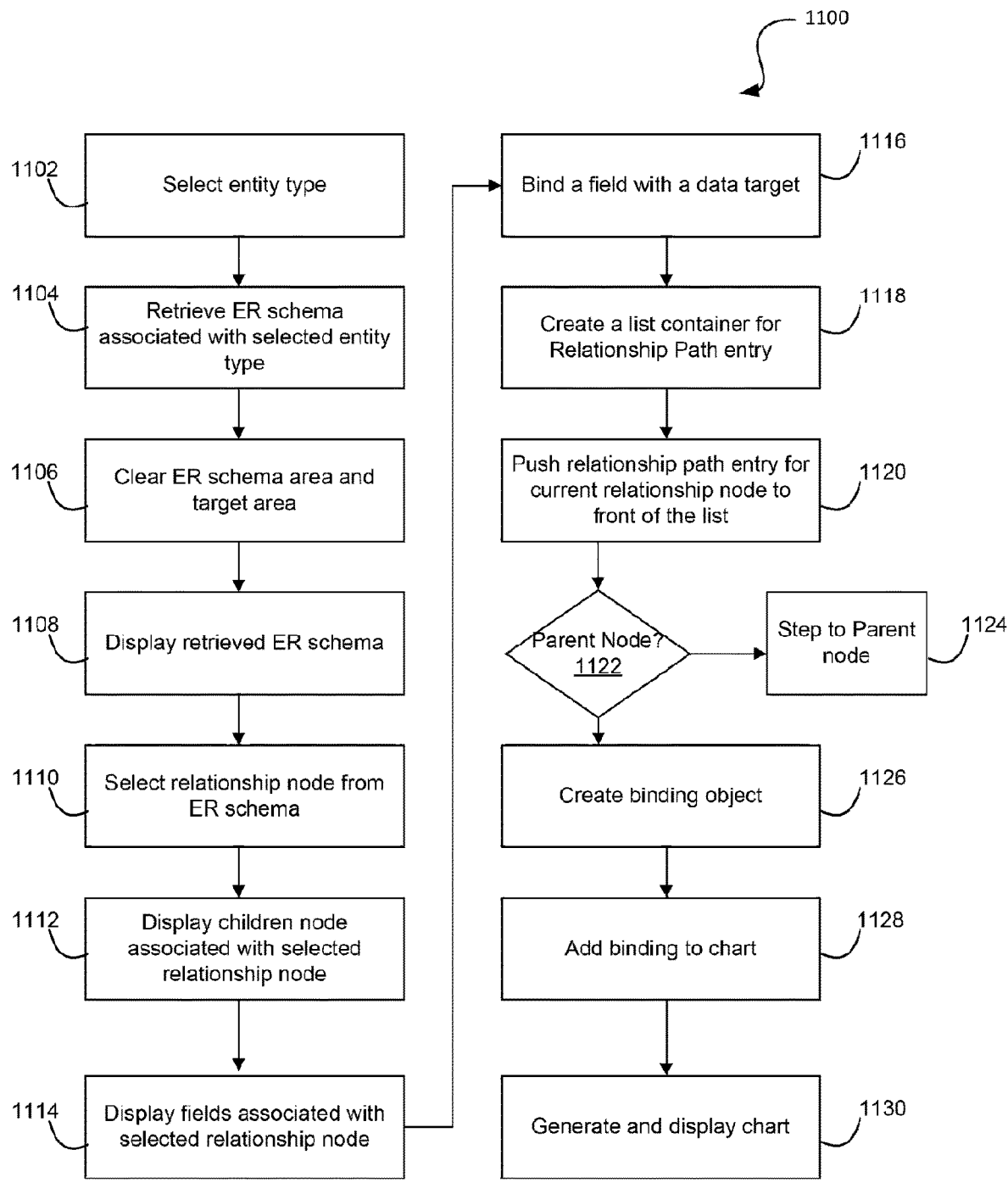
FIG. 11 is a flowchart illustrating an exemplary method for generating visualizations based on ER data according to some aspects of the present disclosure.

The method of generating visualizations based on ER data may be implemented using the computer system 200 wherein the process of FIG. 11, to be described, may be implemented as one or more software application programs 233 executable within the computer system 200. In particular, the steps of the method of generating visualizations are effected by instructions 231 (see FIG. 2B) in the software 233 that are carried out within the computer system 200. The software instructions 231 may be formed as one or more code modules, each for performing one or more particular tasks. For example, the software may be divided into a code model for managing a user interface 280 that allows a user to generate a chart based on underlying ER data and an input module 282 that is configured to accept user selections, such as selection of an entity type, a node type or a chart type made in the user interface. The software may also include an extractor code module 284 configured to retrieve an ER schema and fields associated with entities in the ER schema from the database 108 and an output module 286 to display the ER schema and fields in the user interface. The software may also include a code module such a chart generator 286 for generating charts based on user selections in the user interface.

The software may be downloaded from the cloud platform 102 and stored in a computer readable medium, including the storage devices described below, for example. The software is loaded into the computer system 200 from the computer readable medium, and then executed by the computer system 200. A computer readable medium having such software or computer program recorded on the computer readable medium is a computer program product. The use of the computer program product in the computer system 200 preferably effects an advantageous apparatus for generating visualizations based on ER data.

In some instances, the application programs 233 may be read by the user from the cloud platform 102. Application programs that have been read from the cloud platform may be stored on the computer system in memory 206 or cached on computer readable storage media for fast access. Computer readable storage media refers to any non-transitory tangible storage medium that provides recorded instructions and/or data to the computer system 200 for execution and/or processing. Examples of such storage media include a hard disk drive, USB memory, a magneto-optical disk, or a computer readable card such as a PCMCIA card and the like, whether or not such devices are internal or external of the computer module 201. Examples of transitory or non-tangible computer readable transmission media that may participate in the provision of software, application programs, instructions and/or data to the computer module 201 include radio or infra-red transmission channels as well as a network connection to another computer or networked device, and the Internet or Intranets including information recorded on Websites and the like.

The second part of the application programs 233 and the corresponding code modules mentioned above may be executed to implement one or more user interfaces UIs to be rendered or otherwise represented upon the display 214. Through manipulation of typically the keyboard 202 and the mouse 203, a user of the computer system 200 and the application may manipulate the interface in a functionally adaptable manner to provide controlling commands and/or input to the applications associated with the UI(s).

FIG. 2B is a detailed schematic block diagram of the processor 205 and a "memory" 234. The memory 234 represents a logical aggregation of all the memory modules (including the HDD 209 and semiconductor memory 206) that can be accessed by the computer module 201 in FIG. 2A.

The application program 233 includes a sequence of instructions 231 that may include conditional branch and loop instructions. The program 233 may also include data 232 which is used in execution of the program 233. The instructions 231 and the data 232 are stored in memory locations 228, 229, 230 and 235, 236, 237, respectively. Depending upon the relative size of the instructions 231 and the memory locations 228-230, a particular instruction may be stored in a single memory location as depicted by the instruction shown in the memory location 230. Alternately, an instruction may be segmented into a number of parts each of which is stored in a separate memory location, as depicted by the instruction segments shown in the memory locations 228 and 229.

In general, the processor 205 is given a set of instructions which are executed therein. The processor 205 waits for a subsequent input, to which the processor 205 reacts to by executing another set of instructions. Each input may be provided from one or more of a number of sources, including data generated by one or more of the input devices 202, 203, data received from an external source across one of the networks 220, 202, data retrieved from one of the storage devices 206, 209 or data retrieved from a storage medium 225 inserted into the corresponding reader 212, all depicted in FIG. 2A. The execution of a set of the instructions may in some cases result in output of data. Execution may also involve storing data or variables to the memory 234.

The disclosed user interface for generating visualizations from ER data uses input variables 254, which are stored in the memory 234 in corresponding memory locations 255, 256, 257. The user interface produces output variables 261, which are stored in the memory 234 in corresponding memory locations 262, 263, 264. Intermediate variables 258 may be stored in memory locations 259, 260, 266 and 267.

The method of generating visualizations associated with ER data may alternatively be implemented in dedicated hardware such as one or more integrated circuits performing the functions or sub functions of FIG. 11. Such dedicated hardware may include graphic processors, digital signal processors, or one or more microprocessors and associated memories.

Figure 3A:
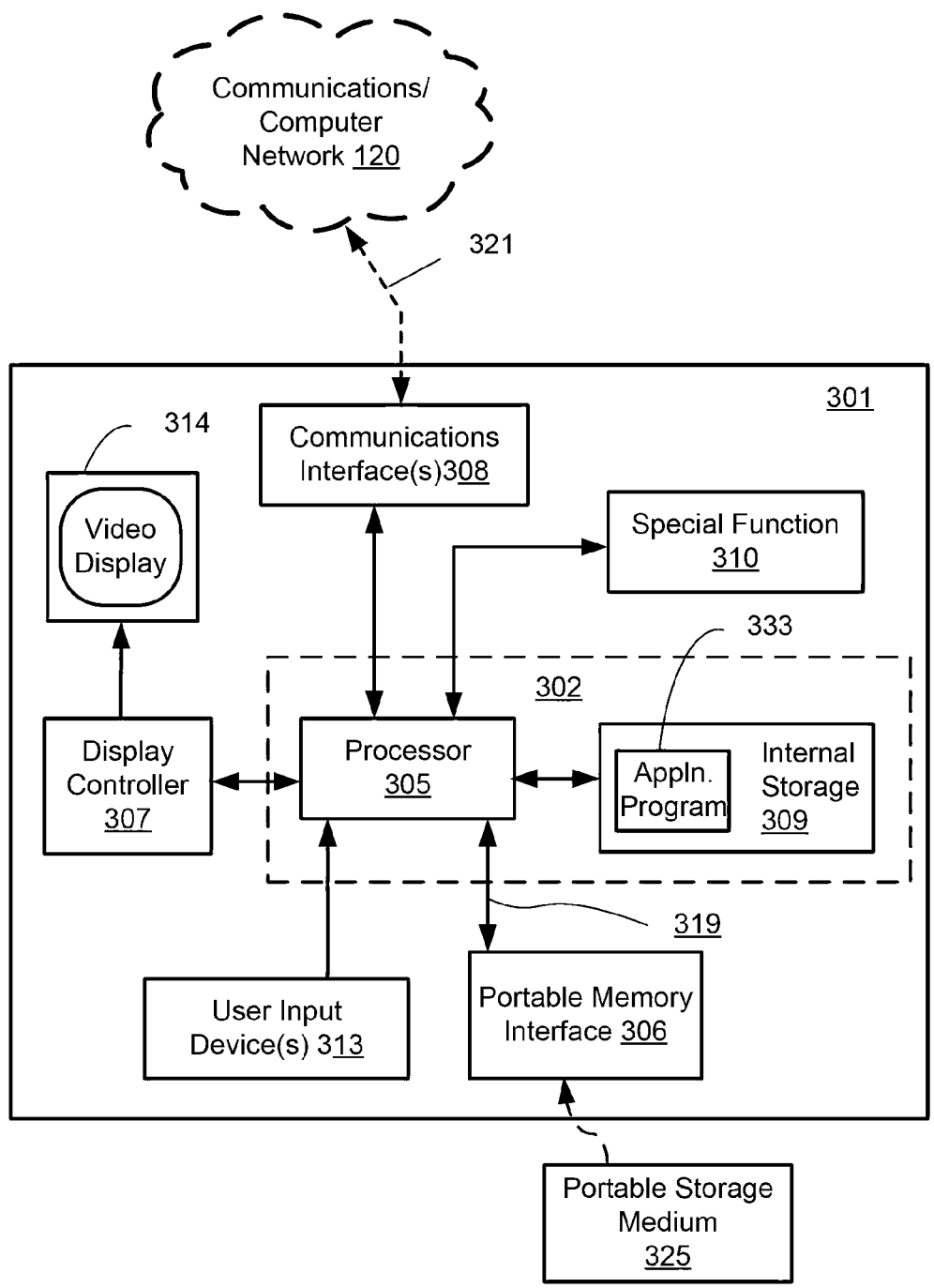
FIGS. 3A and 3B collectively form a schematic block diagram representation of an electronic device upon which described arrangements can be practiced.
Figure 3B:
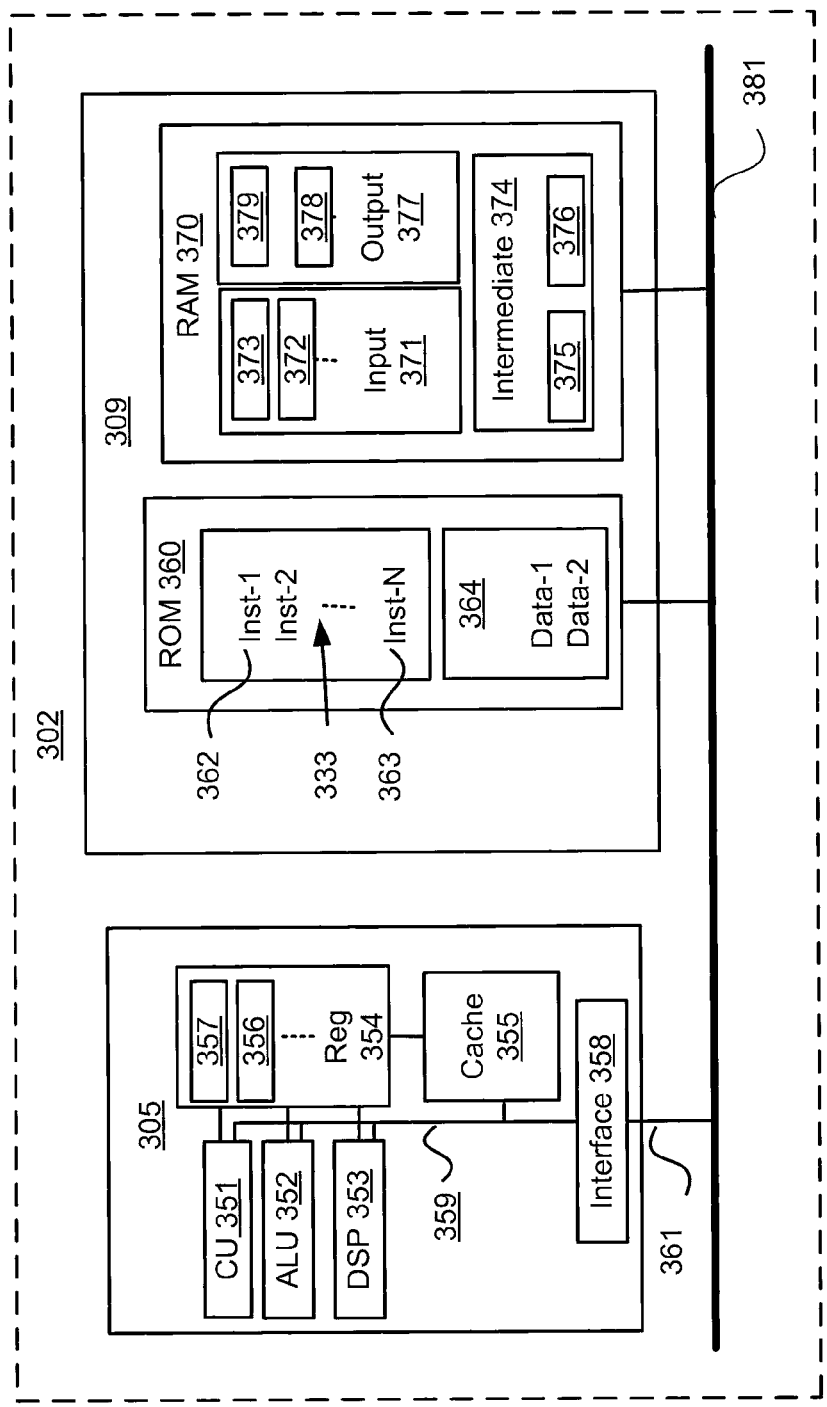

FIGS. 3A and 3B collectively form a schematic block diagram of a general purpose electronic device 301 including embedded components, upon which the herein described methods to be described are desirably practiced. The electronic device 301 may be, for example, a mobile phone, a portable media player or a tablet device, in which processing resources are limited. Nevertheless, the methods to be described may also be performed on higher-level devices such as desktop computers, server computers, and other such devices with significantly larger processing resources.

As seen in FIG. 3A, the electronic device 301 comprises an embedded controller 302. Accordingly, the electronic device 301 may be referred to as an "embedded device." In the present example, the controller 302 has a processing unit (or processor) 305 which is bi-directionally coupled to an internal storage module 309. The storage module 309 may be formed from non-volatile semiconductor read only memory (ROM) 360 and semiconductor random access memory (RAM) 370, as seen in FIG. 3B. The RAM 370 may be volatile, non-volatile or a combination of volatile and non-volatile memory.

The electronic device 301 includes a display controller 307, which is connected to a video display 314, such as a liquid crystal display (LCD) panel or the like. The display controller 307 is configured for displaying graphical images on the video display 314 in accordance with instructions received from the embedded controller 302, to which the display controller 307 is connected.

The electronic device 301 also includes user input devices 313 which are typically formed by keys, a keypad or like controls. In some implementations, the user input devices 313 may include a touch sensitive panel physically associated with the display 314 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 3A, the electronic device 301 also comprises a portable memory interface 306, which is coupled to the processor 305 via a connection 319. The portable memory interface 306 allows a complementary portable memory device 325 to be coupled to the electronic device 301 to act as a source or destination of data or to supplement the internal storage module 309. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 301 also has a communications interface 308 to permit coupling of the device 301 to a computer or communications network 320 via a connection 321. The connection 321 may be wired or wireless. For example, the connection 321 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 301 is configured to perform some special function. The embedded controller 302, possibly in conjunction with one or more further special function components 310, is provided to perform that special function. The special function components 310 are connected to the embedded controller 302. As another example, the device 301 may be a mobile telephone handset. In this instance, the components 310 may represent those components required for communications in a cellular telephone environment. Where the device 301 is a portable device, the special function components 310 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 302, where the processes of FIG. 11 may be implemented as one or more software application programs 333 executable within the embedded controller 302. The electronic device 301 of FIG. 3A implements the described methods. In particular, with reference to FIG. 3B, the steps of the described methods are effected by instructions in the software 333 that are carried out within the controller 302. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 333 of the embedded controller 302 is typically stored in the non-volatile ROM 360 of the internal storage module 309. The software 333 stored in the ROM 360 can be updated when required from a computer readable medium. The software 333 can be loaded into and executed by the processor 305. In some instances, the processor 305 may execute software instructions that are located in RAM 370. Software instructions may be loaded into the RAM 370 by the processor 305 initiating a copy of one or more code modules from ROM 360 into RAM 370. Alternatively, the software instructions of one or more code modules may be pre-installed in a non-volatile region of RAM 370 by a manufacturer. After one or more code modules have been located in RAM 370, the processor 305 may execute software instructions of the one or more code modules.

The application program 333 is typically pre-installed and stored in the ROM 360 by a manufacturer, prior to distribution of the electronic device 301. However, in some instances, the application programs 333 may be supplied to the user encoded on one or more CD-ROM (not shown) and read via the portable memory interface 306 of FIG. 3A prior to storage in the internal storage module 309 or in the portable memory 325. In another alternative, the software application program 333 may be read by the processor 305 from the network 320, or loaded into the controller 302 or the portable storage medium 325 from other computer readable media. Computer readable storage media refers to any non-transitory tangible storage medium that participates in providing instructions and/or data to the controller 302 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 301. Examples of transitory or non-tangible computer readable transmission media that may also participate in the provision of software, application programs, instructions and/or data to the device 301 include radio or infra-red transmission channels as well as a network connection to another computer or networked device, and the Internet or Intranets including e-mail transmissions and information recorded on Websites and the like. A computer readable medium having such software or computer program recorded on it is a computer program product.

The second part of the application programs 333 and the corresponding code modules mentioned above may be executed to implement one or more graphical user interfaces (GUIs) to be rendered or otherwise represented upon the display 314 of FIG. 3A. Through manipulation of the user input device 313 (e.g., the keypad), a user of the device 301 and the application programs 333 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 3B illustrates in detail the embedded controller 302 having the processor 305 for executing the application programs 333 and the internal storage 309. The internal storage 309 comprises read only memory (ROM) 360 and random access memory (RAM) 370. The processor 305 is able to execute the application programs 333 stored in one or both of the connected memories 360 and 370. When the electronic device 301 is initially powered up, a system program resident in the ROM 360 is executed. The application program 333 permanently stored in the ROM 360 is sometimes referred to as "firmware". Execution of the firmware by the processor 305 may fulfil various functions, including processor management, memory management, device management, storage management and user interface.

The processor 305 typically includes a number of functional modules including a control unit (CU) 351, an arithmetic logic unit (ALU) 352, a digital signal processor (DSP) 353 and a local or internal memory comprising a set of registers 354 which typically contain atomic data elements 356, 357, along with internal buffer or cache memory 355. One or more internal buses 359 interconnect these functional modules. The processor 305 typically also has one or more interfaces 358 for communicating with external devices via system bus 381, using a connection 361.

The application program 333 includes a sequence of instructions 362 through 363 that may include conditional branch and loop instructions. The program 333 may also include data, which is used in execution of the program 333. This data may be stored as part of the instruction or in a separate location 364 within the ROM 360 or RAM 370.

In general, the processor 305 is given a set of instructions, which are executed therein. This set of instructions may be organised into blocks, which perform specific tasks or handle specific events that occur in the electronic device 301. Typically, the application program 333 waits for events and subsequently executes the block of code associated with that event. Events may be triggered in response to input from a user, via the user input devices 313 of FIG. 3A, as detected by the processor 305. Events may also be triggered in response to other sensors and interfaces in the electronic device 301.

The execution of a set of the instructions may require numeric variables to be read and modified. Such numeric variables are stored in the RAM 370. The disclosed method uses input variables 371 that are stored in known locations 372, 373 in the memory 370. The input variables 371 are processed to produce output variables 377 that are stored in known locations 378, 379 in the memory 370. Intermediate variables 374 may be stored in additional memory locations in locations 375, 376 of the memory 370. Alternatively, some intermediate variables may only exist in the registers 354 of the processor 305.

The execution of a sequence of instructions is achieved in the processor 305 by repeated application of a fetch-execute cycle. The control unit 351 of the processor 305 maintains a register called the program counter, which contains the address in ROM 360 or RAM 370 of the next instruction to be executed. At the start of the fetch execute cycle, the contents of the memory address indexed by the program counter is loaded into the control unit 351. The instruction thus loaded controls the subsequent operation of the processor 305, causing for example, data to be loaded from ROM memory 360 into processor registers 354, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 333, and is performed by repeated execution of a fetch-execute cycle in the processor 305 or similar programmatic operation of other independent processor blocks in the electronic device 301.

User Interface

Figure 5:
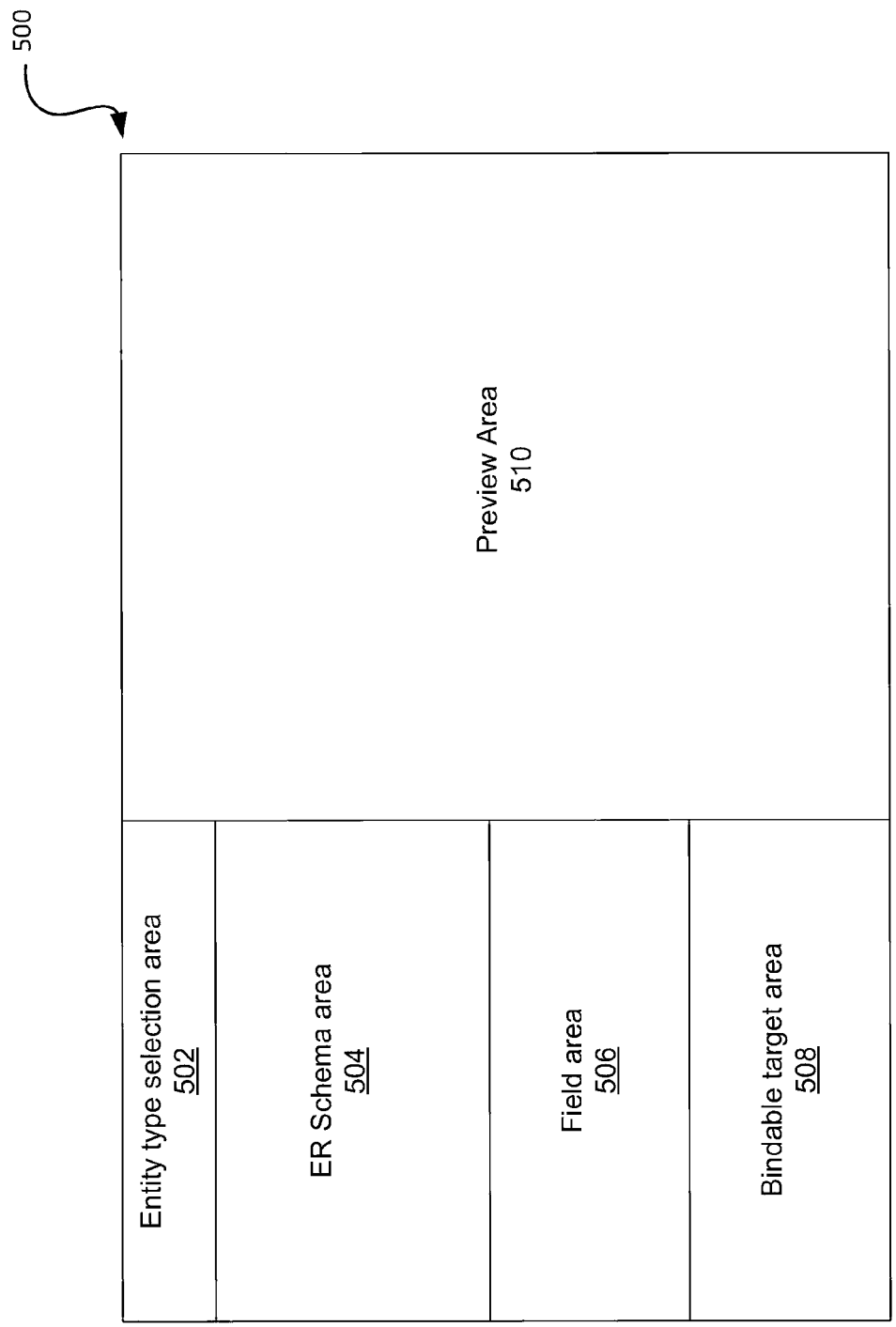
FIG. 5 is an exemplary user interface according to aspects of the present disclosure.

FIG. 5 illustrates an exemplary user interface 500 for allowing visualizations, such as charts, to be easily constructed from the underlying ER data. The user interface 500 may be rendered by the user interface code module 280. Specifically, the user interface 500 provides an integrated interface that allows fields from multiple related entity types to be bound to binding targets.

The user interface 500 includes a mechanism for selecting a type of entity for visualizing, such as an entity type selection area 502, a mechanism for allowing a user to navigate an ER schema associated with the selected entity type, such as an ER schema area 504, a mechanism for displaying fields associated with the selected entity type, such as field area 506, and a mechanism for selecting one or more fields as parameters of a chart, such as target area 508. Optionally, the user interface 500 may include a preview area 510 for displaying a preview of a chart generated based on the selected fields.

The ER schema area 504 displays a portion of the ER schema 400 that is related to a selected entity type. Specifically, the ER schema area 504 allows relationship types from the selected entity type to be followed to different entity types. The field list area 506 displays the fields that are available for an entity type selected in the ER schema area 504. Fields from the field area 506 can be dragged and dropped into a bindable data target in the target area 508.

It will be appreciated that FIG. 5 illustrates only one possible layout for the areas of the user interface 500. Multiple other configurations and layouts can be conceived and all such configurations and layouts are within the scope of the present disclosure. For example, the areas 502-510 can be laid out horizontally or vertically. One or more of the areas may be concealed in tabs. Alternatively, one or more of the areas may be in dockable/movable toolbox windows or displayed in stand-alone dialog windows. The relative sizes and proportions of each area may also be changed or customized by a user.

The entity type selection area 502 can include any one of a number of mechanisms for selecting the type and set of entities for charting. For example, the entity type selection area 502 could include a popup list or a dropdown menu of all the entity types in one or more ER schemas. Alternatively, the entity type selection area 502 may include a search bar in which a user can type an Entity type. The entity type selection area 502 may subsequently display one or more entity types that match the user query. In another implementation, the entity type selection area 502 may display a selection of a pre-existing query or data source, so long as the selection mechanism identifies or implies an entity type and a set of entities (possibly all entities of that type; or a filtered list of entities of that type.

The ER schema area 504 is configured to display at least a portion of a schema associated with the entity type selected in area 502. In one implementation, the ER schema may be displayed in the form of a hierarchical tree explorer, with the selected entity type being the root element of the tree explorer. The tree may be expanded to reveal relationship paths associated with the root entity type. Furthermore, each relationship path can point from one type of entity to (typically) a different type of entity. Each node in the explorer tree representing a relationship path is therefore representative of another entity type. In a repeated manner, each associated entity type in turn can have its relationships followed.

Figure 6:
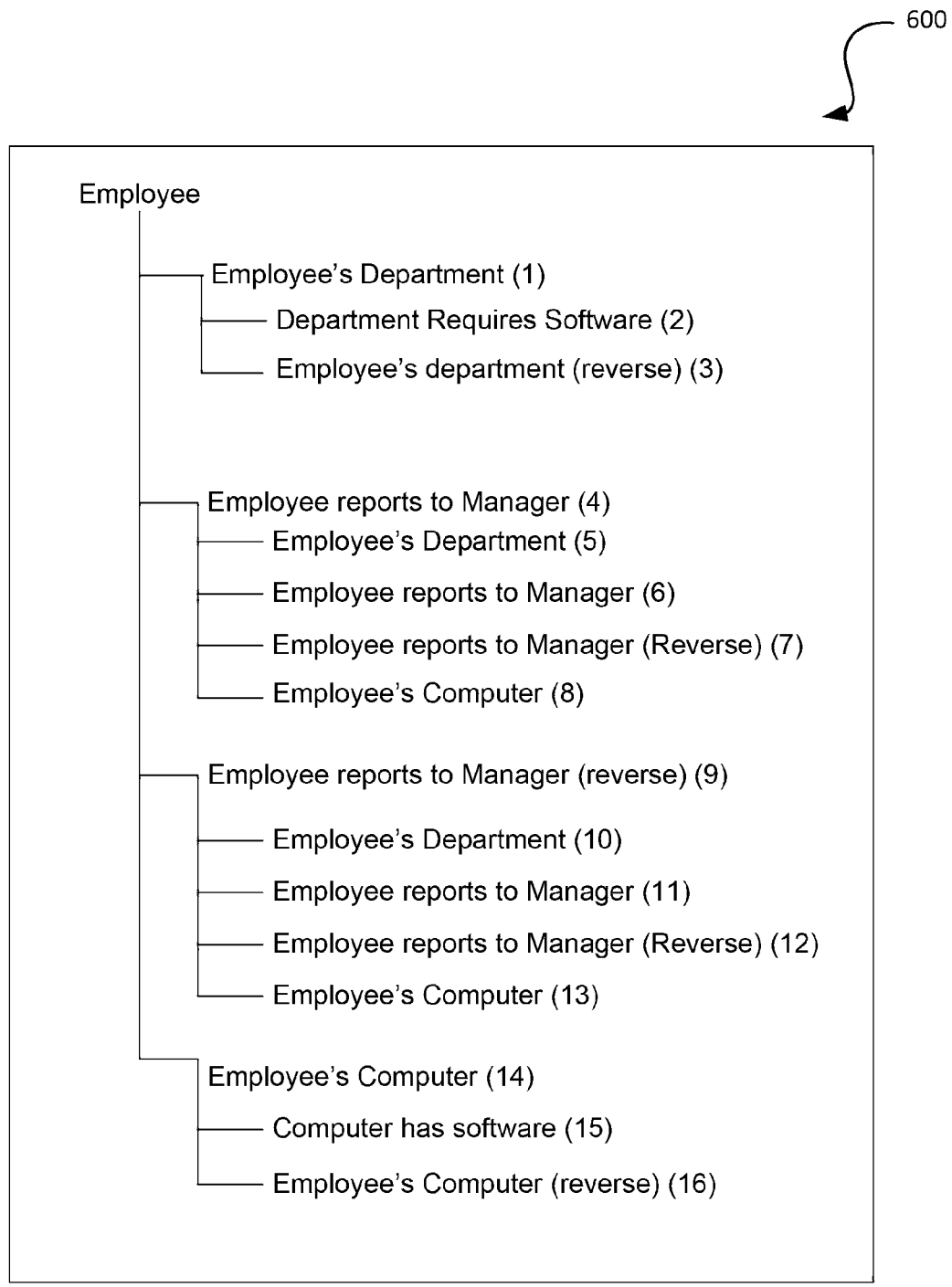
FIG. 6 is an example explorer tree of the entity relationship schema of FIG. 4 according to some aspects of the present disclosure.

FIG. 6 illustrates an example of a tree explorer 600. The tree explorer of FIG. 6 is based on the example ER schema of FIG. 4. Furthermore, in the example tree explorer 600, the entity type 'employee' is selected as the root entity type selected in the entity type selection area 502.

The tree explorer 600 has four child tree nodes (or relationship paths)—Employee's department, Employee reports to manager, Employee reports to manager (reverse) and Employee's computer. These four relationship paths relate to the entity types Department, Employee and Computer, respectively.

The employee's department node can be expanded to reveal two child nodes, namely, department requires software and employee's department (following the relationship back to the employee).

In one aspect, the tree explorer 600 may be designed to prevent relationships being followed back to their source; whereas, in a second aspect, the tree explorer 600 may be designed to allow relationships to be followed back to their source entity. The latter aspect is more flexible. For example, consider in FIG. 6, if the Employee entity is followed to the Department entity via the "Employee's department" relationship type, and then the Department entity follows back to the Employee entity via the "Employee's department (reverse)" relationship. Using this functionality, relationships can be used to relate to other employees in the same department. More generally, following a relationship forward and back again allows a user to access an employee's peers (e.g., from the software entity, the relationship can be followed to the computer and back to the software to determine other software installed on the same computer). One possible downside of allowing relationships to be followed back to their source entity is that it may clutter the user interface. For example, in FIG. 6, nodes 3, 7, 12, 16 are additional nodes that may otherwise be removed. In some examples a less cluttered interface may be preferable as it is less confusing to the user. Similarly, the user interface may be programmed to limit the depth of relationships that can be explored or to display unlimited depth of relationships.

In FIG. 6, the tree explorer is expanded to two levels of children nodes with relationships following back to their source. Accordingly, a child node of each parent node is the parent node in reverse. In FIG. 6, reverse relationships are indicated with the '(reverse)' suffix. However, a person skilled in the art will appreciate that other variations may be employed, such as a visual indicator (e.g., an icon). Alternatively, a relationship may be assigned two names: one applicable in the forward direction, and one applicable in the reverse direction. For example, the relationship employee reports to manager may be the same in the forward direction, but may be employees under manager in the reverse direction.

For the relationship 'employee reports to manager', both the forward and reverse relationships are listed under the parent node 'employee reports to manager'.

As described previously, each node in the tree explorer 600 implies an entity type. Both the entity type and the path to the entity type are significant to define the entity type for each node. For example, the nodes 4, 6, and 7 are all 'employee reports to manager', however, each of these nodes have different meanings. Node 4 refers to an employee's manager, whereas node 6 refers to the manager of the employee's manager and node 7 refers to other employees that report to the same manager. Similarly, nodes 8, 13 and 14 refer to the employee's computer. However, node 8 refers to the employee's manager's computer, node 13 refers to the computers of the employee's direct reports, and node 14 refers to the employee's computer.

The tree explorer 600 may be loaded directly from the entity-relationship store or may be loaded from a cache. For complex or large structures, only part of the tree explorer 600 may be loaded initially to speed up the initial display time. For instance, only the first level of nodes may be loaded initially. When a node is expanded, the rest of the tree structure may be loaded on demand. Alternatively, the entire schema 400 required to generate the tree explorer 600 may be loaded in the background.

Figure 9:
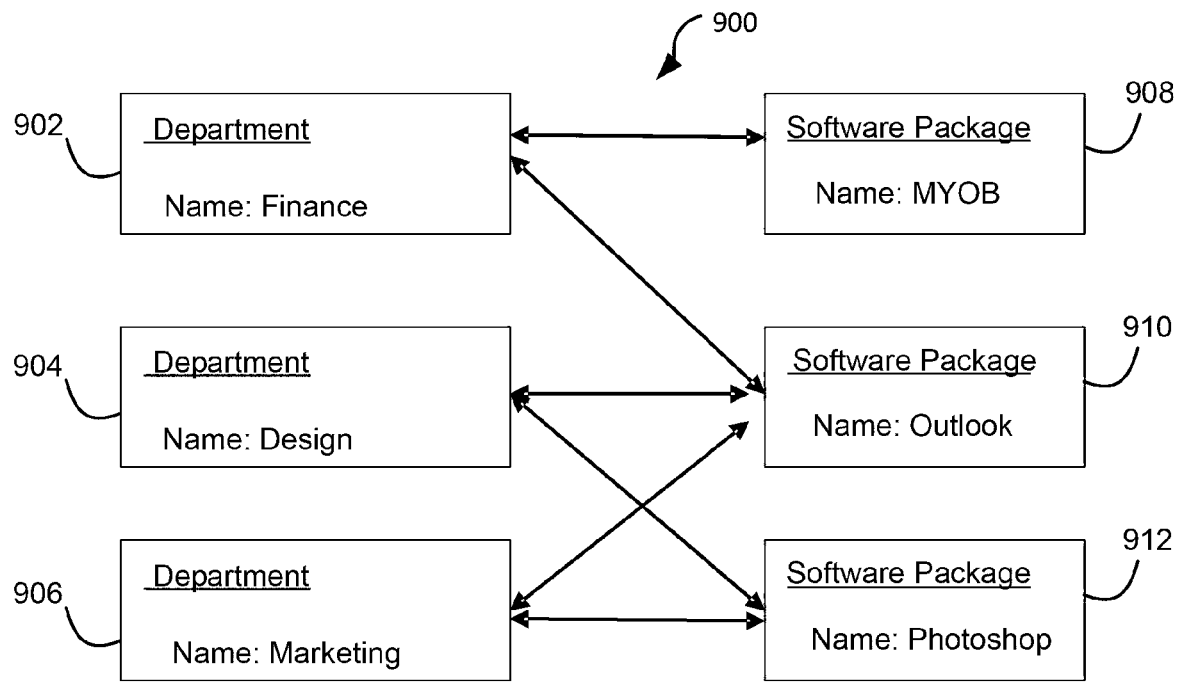
FIG. 9 shows an example of a many to many relationship between instances of entities.

In the tree explorer 600 depicted in FIG. 6, the children nodes are not displayed in any particular order. However, in some aspects, the nodes may be sorted alphabetically, chronologically, based on frequency of usage, etc. Furthermore, the relationships may be explicitly referenced by data as depicted in FIG. 9, or they may be implicit. For example, the system may implicitly offer a relationship path from every entity to an entity that represents the user account responsible for creating it. Alternatively, the system may implicitly expose relationships that automatically span other relationships. For instance, the system might define an implicit relationship between the user entity and the software entity if an explicit relationship path exists between the user entity and the computer entity and between the computer entity and the software entity.

In another aspect, the relationships may be calculated or may be based on a filtered list of real relationship data. For example, a 'department licenses software' relationship may be calculated between the department and software entities by drawing on the existing 'department requires software' relationship and then filtering out the relationships based on an imagined 'software is licensed' field on the software entity. In this way, adding/removing 'department requires software' relationship instances, or modifying 'software is licensed' settings may automatically update the calculated 'department licenses software' relationship.

The distinction between implicit relationships and calculated relationships is that implicit relationships may include other things provided by the system, whereas calculated relationships manipulate the user's data in some way.

Additionally, a user or developer may customize the number of levels of the tree explorer 600. Different types of nodes in the tree may be displayed with different visual indicators, such as colour or icon. Different types of nodes may indicate factors such as the relationship cardinality, whether it is calculated, whether it is performing some form of filtering. The root node may be treated specially.

Moreover, instead of a tree, the ER schema area may be configured to display the ER schema in a 'directory style', with slash separated list of relationships. Alternatively, the ER schema may be illustrated using drop down menus that display relationships to follow from each point in the tree. In yet another aspect, the ER schema may be displayed as a diagram that allows relationship paths to drawn.

The field area 506 is configured to display one or more fields associated with an entity selected in the ER schema area 504. The exact path to a node determines which individual entity instance is used when data is collected. For example, if node #14 'employee's computer' is selected, the entity type is computer. In this case, fields that are relevant to computers, such as model number, bay number, or total RAM capacity may be displayed in the field area 506. Alternatively, if the employee entity type is selected, the fields may include first name, last name, email, start date, and so on. The fields may represent various natural data types such as text, numeric, dates, and so on. Visual indicators may also be used to indicate the natural type of a given field as shown in FIG. 7.

If the entity model includes some form of type inheritance or multiple type inheritance mechanism, then fields that are applicable to the ancestor type or types are shown. Inheritance allows for one entity type to extend to another. For example, a 'person' entity type may include fields such as first name, last name, etc. An 'employee' entity type may then further extend on these fields with additional fields such as employee ID. Multiple inheritance provides for inheriting more than one entity type. For example, a 'network printer' entity type may inherit from a 'network resource' entity type (that describes network IP address), as well as from a 'business asset' entity type (that describes purchase value).

When a node is selected in the ER schema area 504, the field list is updated to list the fields that are applicable to the entity type of that node.

The target area 508 lists a set of bindable data targets that may apply to a chart type. The chart type may be selected in a separate chart type area (not shown) or the chart type may be selected in the target area 508. Depending on the chart type selected, the list of bindable data targets is updated. For instance, if a bar chart is selected, the bindable data targets may be the x axis and the y axis of the chart. Alternatively, if a pie chart is selected the bindable data targets may be the value that drives the relative angle of each pie slice, or it may be the text label that appears within each slice. Any fields that were bound to a data target that is no longer applicable can either be forgotten or retained in case the user changes back to a previously selected chart type. In another implementation, the user interface may be configured to suggest a likely default field for a data target.

Table 1 illustrates a list of suitable chart types along with their mandatory and optional bindable data targets.

TABLE 1

Chart types and their bindable data targets

| Chart type | Primary | Value | End Value | Size | Associate | Color | Text | Image | Symbol |
|---|---|---|---|---|---|---|---|---|---|
| Line | Mandatory | Mandatory | | | | Optional | Optional | | Optional |
| Area | Mandatory | Mandatory | Optional | | | Optional | Optional | | |
| Column | Optional | Mandatory | Optional | | | Optional | Optional | | |
| Bar | Optional | Mandatory | | | | Optional | Optional | | |
| Pie | | Mandatory | | | | Optional | Optional | Optional | |
| Donut | | Mandatory | | | | Optional | Optional | Optional | |
| Matrix | | Mandatory | | | | Optional | Optional | Optional | |
| Scatter | | Mandatory | | | | Optional | Optional | | Optional |
| Bubble | | Mandatory | | Optional | | Optional | Optional | Optional | |
| Funnel | | Mandatory | | | | Optional | Optional | Optional | |
| Gauge | | Mandatory | | | | | | | |
| Tree Map | Mandatory | Mandatory | | | Optional | Optional | Optional | Optional | |
| Force Graph | Mandatory | | | | Optional | Optional | Optional | | |
| Horz Hierarchy | Mandatory | | | | Optional | Optional | Optional | | |
| Radial Hierarchy | Mandatory | | | | Optional | Optional | Optional | | |
| Sunburst | Mandatory | Optional | | | Optional | Optional | Optional | Optional | |

In the table, the 'primary' bindable data target is an independent value, typically the x-axis for charts that include an x-axis and the 'value' bindable data target is the dependent value, typically the y-axis for charts that include a y-axis. The 'end-value' data target can be used for chart types that depict ranges and this target indicates the end of a range. The 'size' data target may be used to affect the size of a bubble in a bubble chart, whereas the 'associate' data target may be used in chart types that display hierarchical data. The 'associate' target identifies the field that includes the hierarchy link (e.g., associating a person's name with the 'primary' target and their manager's name with the 'associate' target may be used to create an organizational hierarchy chart). The 'colour' target may be used to generate unique data point colours, the 'text' target may be used to show a label near each data point, and the 'image' target may support pictures as a possible type of field. Charts that fill area, such as pie charts or bubble charts, can have the area painted with a picture. For example, a bubble chart may be created with a person's face in each bubble. A field may be associated with the 'symbol' target to cause unique markers to appear. For example, dropping an 'employee's job title' against the symbol target may display a unique symbol for each job title.

A user can bind one or more fields from the field list 506 within one or more data targets. For example, if the root node 'employee' is selected in the ER schema 504 and the fields first name, last name, date of joining, manager's start date, phone number, and email address are displayed in the field list 506, a user may bind the field 'employee start date' onto one bindable target and the field 'manager's start date' into the second bindable target.

In one aspect, the user can drag and drop fields in the data targets. Alternatively, the user may select fields from drop down menus against each data target. In this case the drop down menus can be prepopulated with fields associated with the entity selected in the ER schema area 504. In the user interface 500, the field list 506 and the target area 508 are depicted as separate areas. However, a person skilled in the art will appreciate that these two areas may be combined. Especially in the case where the field lists are displayed in drop down menus associated with each data target.

Figure 8:
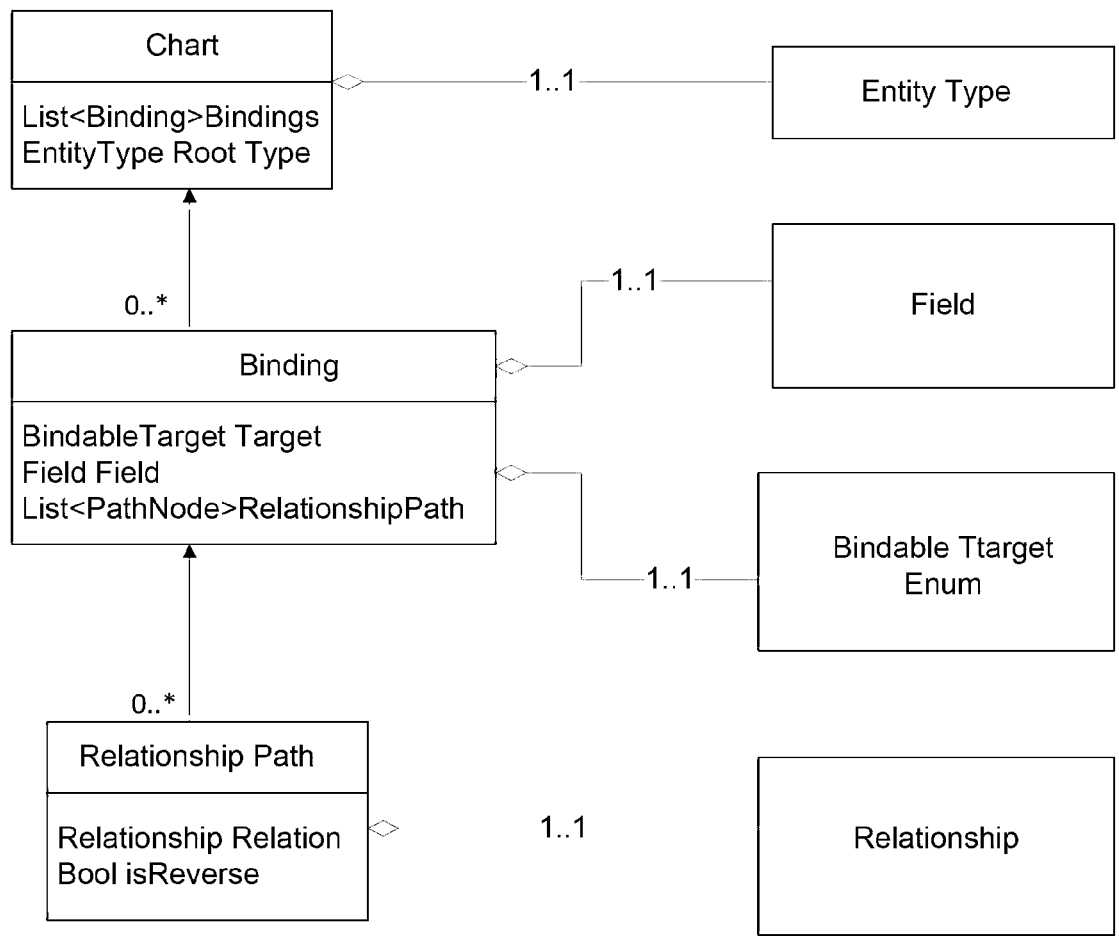
FIG. 8 is an example UML data structure for storing data when a field is assigned to a bindable data target.

Once a field is bound to a data target, two pieces of information are stored against the data target: the selected field, and the relationship path to the selected node in the relationship tree. The information captured in this manner may be stored in a data structure as illustrated in FIG. 8. An instance of a chart represents the overall diagram, including a relationship to the initial type of entity being visualized. The Chart also references multiple binding instances, one for each chart target that has been bound, such as x-axis value, y-axis value, and so on. Each binding instance has a reference to the type of binding target that it applies to. The binding instance also has a reference to the field 506 that was associated with the binding target 508. Each binding instance also contains information about the relationship path that was selected 504 at the time the field was associated with the target. The relationship path is represented by linking to multiple instances of a relationship path, in the order of the path. Each relationship path instance represents one link in relationship path, and references the relationship type 400 schema that was followed, as well as whether it was followed in the forward direction or the reverse direction.

There are other possible implementations of the data structure. For example, information could be stored against each relationship that has been followed. Components that have been expressed as enum (enumeration) may be represented by identifiers or objects. Identifiers may instead reference components that are referenced as members. Furthermore, the relationship path may be represented as a separate data structure, as a linked list, or as a vector.

Once one or more fields are bound to the data targets, the user interface may automatically display a review of a chart based on the selected fields. Alternatively, a user action may activate display of the chart. In one scenario, each entity instance of a selected entity type is translated into one data point on a chart. Any fields from that entity that are bound to a data target are used for the purpose of that target when rendering a chart. For example, if an employee's job title is attached to the horizontal position data target of a bar chart, then the employee's job title will be used as the x-axis value.

If a field is retrieved from a related entity, then the relationship instances relative to the entity instance currently being considered are followed to arrive at a related entity instance. The field value is then loaded from the related entity instance. For example, if the 'Employee's department' relationship is followed, and a 'name' field is associated with the vertical position in the chart, then the name of the employee's department will be used to determine a vertical position.

The cardinality of the relationship becomes important at this point. If the cardinality of a relationship is such that there can only be one relationship instance, then a single value is calculated. This value is subsequently visualised as a single data point (e.g. a bar in a bar chart). For instance, if each employee is in only one department, then there is only one related field data value for that binding. Alternatively, if there are zero relationship instances (for example, if an employee were to have no department) then the field value for that instance would be null. Null data may be represented by showing no data point (no bar on a bar chart), or by displaying a special null designation on the axis and any null values aligned to that designation. Alternatively, a null data value may be treated equivalent to zero or blank.

In the scenario where a particular entity instance has multiple relationship instances for a specified relationship type, a fan-out scenario is handled. For example, the 'department' entity may relate to multiple 'requires software' entities. In this case, multiple visualization options are available. One option resembles a typical left join pattern used in relational databases. Rather than each root entity instance yielding a single visualization data point, some root entity instances may yield multiple data points. Each of the entities that is used, or passed through, anywhere in the tree is combined into a group commonly called a tuple. Each unique combination of values—that is to say each unique tuple—then becomes a data point.

Consider a scatter chart that uses Department as its root entity type. That chart would ordinarily have one data point per entity. Consider data bindings such that the Department name is used as the horizontal position (x-value). The departments 'Requires software' relationship is followed, and the software name is used as the vertical position (y-value). For the purpose of the example, assume that the cardinality of this relationship is many-to-many, such that each department may require multiple software packages, and each software-package may be required by multiple departments. FIG. 9 illustrates three departments—Finance 902, Design 904, and Marketing 906 and three software packages—MYOB 908, Outlook 910 and Photoshop 912 that are used by these three departments. Finance 902 uses Outlook 910 and MYOB 908, whereas Design 904 and Marketing 906 use Outlook 910 and Photoshop 912.

Figure 10:
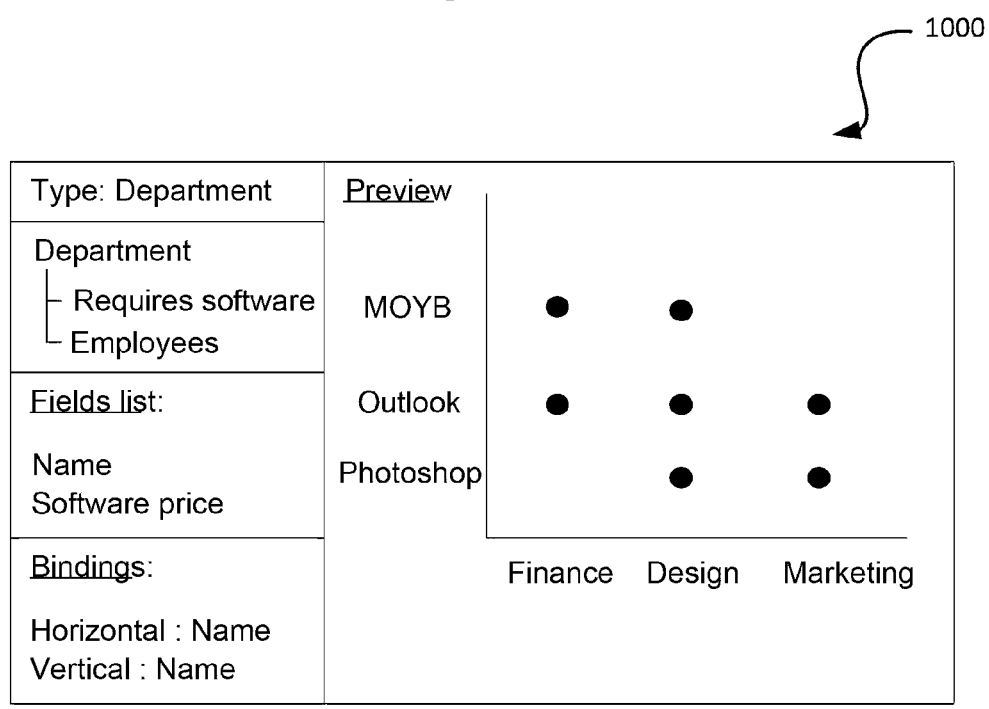
FIG. 10 is a scatter chart example.

A scatter chart 1000 for this scenario is depicted in FIG. 10. The department name is plotted against the x axis, whereas the software name is plotted against the y axis. In this scenario, every department requires more than one software and every software is used by more than one department. Each combination of department and software results in one data point that feeds into the scatter chart.

The full potential of charts are often not realized when rendering data points for individual entities. Aspects of the present disclosure also allow pivoting of data. Pivoting aggregates multiple records into a single value such as a count or a sum. This function may be supported by exposing a drop-down on the binding targets, whereby any dropped field can have an aggregate operation such as count, sum, average, maximum or minimum, standard deviation, standard error, variance, applied (if desired). If any one of these functions is applied to a field, the field is said to be pivoted.

Data points that share the same value for non-pivoted fields are then bundled together into groups so that a single data point can be used to represent a whole group. The non-pivoted fields take on the value common to all members of the group. The pivoted fields apply their selected aggregate operation (such as average) on each member of the group, and that average becomes the value for the overall group.

Apart from pivoting of an overall data set, such as described above, an entity-relationship data source provides a unique opportunity for pivoting only certain sub branches of related data.

Once a chart is displayed in the preview area 510, a user may change the fields used for the chart or the chart type to preview another chart. Once the user is satisfied with the chart preview, the user interface may allow the user to export the displayed chart. Export options may include printing, saving, converting to a PDF or JPG format file, emailing, etc.

FIG. 11 is a flowchart illustrating an exemplary method for generating a chart based on ER data. The method begins at step 1102 where an entity type is selected from the entity type selection area 502. The input module 282 receives the user selection and instructs the extractor module 284 to retrieve the ER schema associated with the selected entity type from the database 180 at step 1104. The ER schema includes a root node corresponding to the selected entity type. Subsequently, at step 1104, the user interface module 280 clears the ER schema area 504 and all existing bindings in the target area 508. At step 1106, the retrieved root node is added in the ER schema area 502 and the ER schema associated with that root node is loaded from the database or cache in the background. The output module 286 displays a list of fields associated with the root entity in the field area 504.

At step 1110, a user selects a relationship node from the ER schema area 504. In case the relationship node is collapsed, the input module 282 receives this user selection and instructs the output module 286 to retrieve the children nodes of the selected relationship node from the extractor 284 and display children nodes associated with the selected relationship node in the ER schema area 504, at step 1112. For instance, if a user selects the node 'employee reports to manager', that node is expanded to reveal all its children nodes 5-8. At step 1114, the list of fields in the field area 506 is updated to display the fields associated with an entity type of the selected relationship node.

When a field is dragged using the mouse 203 from the field area 506 and dropped onto a data target in the target area 508 (at step 1116), a list container is created for the relationship path entry at step 1118. The relationship path entry for the current relationship node is then created in the list container and pushed to the front of the list container at step 1120. The extractor code module 284 then checks at step 1122 if the currently selected node has a parent. If the currently selected node has a parent node, a relationship path entry is created for the parent node and pushed to the front of the container list at step 1124. Alternatively, if no parent node exists for the selected relationship node, at step 1126 a binding object is created by using the container list, the selected field, and the binding target that the selected field was bound to.

A selected chart type and the binding is subsequently provided to the chart generator 286 at step 1128 for generating a chart based on the chart type and the binding. The generated chart is then rendered on the preview area 510 by the output module 286 at step 1130.

Aspects of the present disclosure therefore provide a user interface and a method for generating charts based on ER data without the need of first converting the ER data into a tabular format. By foregoing the intermediate step, aspects of the present disclosure provide a simple and user friendly interface that allows novice users to generate charts.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A user interface for allowing a user to create a chart, the user interface comprising:
an entity type selection area for allowing a user to select an entity type from a plurality of entity types available in an entity-relationship schema of a database;
an explorer for displaying the entity-relationship schema associated with the selected entity type and allowing a user to navigate the schema by selecting one or more relationship paths to display one or more fields of an entity associated with the selected relationship path, whereby each relationship path corresponds to the entity type according to the entity relationship schema, wherein each relationship path defines a logical relationship between one type of entity and a different type of entity, and wherein the user can further extend the relationship path by selecting from relationship types that are connected to the corresponding entity type in either direction according to the entity relationship schema;
a list area for displaying one or more available fields of the entity type associated with the currently selected relationship path selected from the explorer; and
a target area configured to enable a user to assign one or more of the available fields to bindable data targets to create a binding instance to create the chart, wherein each binding instance contains information about the selected relationship path at the time the one or more available fields are assigned to the bindable data targets, each relationship path is represented by linking to a plurality of relationship path instances of the relationship path, in an order of the relationship path, each relationship path instance representing one link in the relationship path, and when the one or more available fields are assigned to the bindable data targets, a user action activates display of the chart.

2. The user interface of claim 1, further comprising:
a preview area for displaying the chart based on the fields bound with the bindable data targets.

3. The user interface of claim 1, further comprising a mechanism to select a chart type.

4. The user interface of claim 1 further comprising:
a chart type selection area allowing a user to select from a plurality of chart types; and
a target area for displaying a list of bindable data targets, wherein the list of bindable data targets varies as a function of the chart type selected by the user and includes both mandatory bindable data targets and optional bindable data targets; and
wherein each bindable data target has associated therewith a binding instance, wherein the binding instance contains information about the relationship path associated with the bindable data target, and further wherein the relationship path is represented by linking to multiple instances of a relationship path, in the order of the path.

5. A method for generating a chart based on entity relationship data, the method comprising:
selecting an initial entity type for which a chart will be generated;
determining from a database an entity relationship schema;
displaying one or more relationship paths of the entity relationship schema associated with the selected initial entity type, wherein each relationship path defines a logical relationship between one type of entity and a different type of entity;
selecting a relationship path from the displayed entity relationship schema;
displaying one or more available fields of the entity type that corresponds to the selected relationship path;
assigning a displayed field to a bindable data target to create a binding instance, wherein each binding instance contains information about the selected relationship path at the time the one or more available fields are assigned to the bindable data targets, each relationship path is represented by linking to a plurality of relationship path instances of the relationship path, in an order of the relationship path, each relationship path instance representing one link in the relationship path, and when the one or more available fields are assigned to the bindable data targets, a user action activates
generating the chart based on the field assigned to the bindable data target by:
loading entity instances of the initial entity type;
traversing relationship instances from those entity instances according to the selected relationship path to determine at least one other entity instance;
loading a data value for the assigned field for the determined at least one other entity instance; and
generating the chart using the loaded data value for a purpose indicated by the bindable data target to which the assigned field is assigned.

6. The method of claim 5, further comprising selecting a chart type.

7. The method of claim 5, further comprising storing the generated chart in a memory.

8. The method for generating a chart based on entity relationship data of claim 5, wherein the step of assigning a displayed field to a bindable data target further comprises assigning a displayed field to a mandatory bindable data target and assigning a second displayed field to an optional bindable data target.

9. The method for generating a chart based on entity relationship data of claim 5, further comprising generating a binding instance for each bindable data target having a displayed field assigned thereto, the binding instance including a representation of a relationship path between the initial entity type and the at least one other entity instance.

10. A system for generating a chart based on entity relationship data, the system comprising:
a database storing one or more entity-relationship schema;
a user interface comprising:
an explorer area for displaying, and enabling selection of, one or more relationship paths of an entity relationship schema associated with a selected entity type, the entity relationship schema being of the one or more entity relationship schema stored in the database;

a list area for displaying one or more fields associated with the currently selected relationship path selected from the entity relationship schema; and a target area for displaying bindable data targets and configured to enable a user to assign one or more fields displayed in the list area to the bindable data targets; and a processor; and a non-transitory computer-readable storage medium storing a program to be executed by the processor, the program including instructions for receiving an entity type selection made by a user; and generating and storing in the computer-readable storage medium a binding instance for each bindable data target having one or more fields assigned thereto, the binding instance including a representation of each link on the selected relationship path, each relationship path defining a logical relationship between one type of entity and a different type of entity, wherein each binding instance contains information about the one or more selected relationship paths at the time the one or more available fields are assigned to the bindable data targets, each relationship path is represented by linking to a plurality of relationship path instances of the relationship path, in an order of the relationship path, each relationship path instance representing one link in the relationship path, and when the one or more available fields are assigned to the bindable data targets, a user action activates generating the chart based on the fields assigned to the bindable data targets.

11. The system of claim 10, wherein the user interface further comprises a preview area for displaying the chart based on the fields bound with the bindable data targets.

12. The system of claim 10, further comprising a mechanism to select a chart type.

13. The system of claim 11 further comprising a database for storing the displayed chart and the entity relationship schema.

14. The system for generating a chart based on entity relationship data of claim 10, wherein the bindable data targets include both mandatory bindable data targets and optional bindable data targets.

15. The system for generating a chart based on entity relationship data of claim 10, wherein the user interface further comprises:

a chart type selection area allowing a user to select from a plurality of chart types; and a target area for displaying a list of bindable data targets, wherein the list of bindable data targets varies as a function of the chart type selected by the user and includes both mandatory bindable data targets and optional bindable data targets; and wherein each bindable data target has associated therewith a binding instance, wherein the binding instance contains information about the relationship path associated with the bindable data target, and further wherein the relationship path is represented by linking to multiple instances of a relationship path, in the order of the path.

16. A non-transitory computer readable medium having stored thereon a computer program for generating a chart based on entity relationship data, the computer program comprising instructions to:

obtain from a database data including one or more entity relationship schema;

render a user interface including an explorer area for displaying, and enabling selection of, one or more relationship paths of an entity relationship schema associated with a selected entity and selected from the one or more entity relationship schema in the database, each relationship path defining a logical relationship between entities of the entity relationship schema, a field area for displaying one or more fields associated with the currently selected relationship path selected from the entity relationship schema, and a target area for displaying bindable data targets and configured to enable a user to assign one or more fields displayed in the field area to the bindable data targets to create a binding instance, wherein each binding instance contains information about the one or more selected relationship paths at the time the one or more available fields are assigned to the bindable data targets, each relationship path is represented by linking to a plurality of relationship path instances of the relationship path, in an order of the relationship path, each relationship path instance representing one link in the relationship path, and when the one or more available fields are assigned to the bindable data targets, a user action activates generating the chart based on the fields assigned to the bindable data targets;

retrieve the selected entity relationship schema from the database for displaying on the user interface;

retrieve user assignment of one or more fields to the bindable data targets; and generate the chart based on the retrieved user assignment of the one or more fields to the bindable data targets, and to the bindable data targets if selected.

17. The non-transitory computer readable medium of claim 16, wherein the computer program further comprises instructions to enable selection of a chart type.

18. The non-transitory computer readable medium of claim 16, wherein the computer program further comprising instructions to:

generate and store in the computer readable storage medium at least one binding instance including a representation of the selected entity and of the currently selected relationship path.

19. The non-transitory computer readable medium of claim 16, wherein the computer program further comprising instructions to:

select from a plurality of chart types; and display a list of bindable data targets, wherein the list of bindable data targets varies as a function of the chart type selected by the user and includes both mandatory bindable data targets and optional bindable data targets; and wherein each bindable data target has associated therewith a binding instance, wherein the binding instance contains information about the relationship path associated with the bindable data target, and further wherein the relationship path is represented by linking to multiple instances of a relationship path, in the order of the path.

* * * * *